(12) United States Patent
Uhlending et al.

(10) Patent No.: US 6,510,680 B2
(45) Date of Patent: Jan. 28, 2003

(54) APPARATUS AND METHOD FOR PIVOTAL ADJUSTMENT OF A FRONTAL ATTACHMENT IN AN AGRICULTURAL MACHINE

(75) Inventors: Hubert Uhlending, Dülmen (DE); Holger Thiemann, Gütersloh (DE)

(73) Assignee: Claas Selbstfahrende Erntemaschinen GmbH, Harsewinkel (DE)

( * ) Notice: Subject to any disclaimer, the term of this patent is extended or adjusted under 35 U.S.C. 154(b) by 0 days.

(21) Appl. No.: 09/833,981

(22) Filed: Apr. 12, 2001

(65) Prior Publication Data

US 2002/0005033 A1 Jan. 17, 2002

(30) Foreign Application Priority Data

Apr. 12, 2000 (DE) .......................................... 100 18 211

(51) Int. Cl.[7] ................................................ A01D 75/28
(52) U.S. Cl. ................... 56/208; 56/10.2 R; 56/10.2 E; 56/14.9; 56/16.2; 56/DIG. 10
(58) Field of Search ........................ 56/10.2 R, 10.2 E, 56/14.9, 15.1, 15.2, 15.8, 15.9, 16.2, 208, 209, 210, 212, 213, 214, DIG. 10; 172/810, 811, 824, 825, 826

(56) References Cited

U.S. PATENT DOCUMENTS

| 2,821,059 | A | * | 1/1958 | Heitshu | 56/209 |
|---|---|---|---|---|---|
| 2,904,341 | A | | 9/1959 | Heitshu | |
| 3,008,724 | A | * | 11/1961 | Lapins et al. | 56/209 |
| 3,065,590 | A | * | 11/1962 | Knollman | 56/209 |
| 3,474,606 | A | * | 10/1969 | Oehler et al. | 56/208 |
| 3,731,470 | A | * | 5/1973 | Cornish et al. | 56/208 |
| 4,266,392 | A | * | 5/1981 | Knepper et al. | 56/14.5 |
| 4,733,523 | A | * | 3/1988 | Dedeyne et al. | 56/10.2 E |
| 5,359,836 | A | * | 11/1994 | Zeuner et al. | 56/10.2 E |
| 5,415,586 | A | * | 5/1995 | Hanson et al. | 56/10.2 E |
| 6,151,874 | A | * | 11/2000 | Eis | 56/10.2 E |
| 6,318,057 | B1 | * | 11/2001 | Burmann | 56/10.2 R |

FOREIGN PATENT DOCUMENTS

| DE | 41 05 260 A1 | | 10/1991 |
|---|---|---|---|
| DE | 41 31 433 A1 | | 4/1993 |
| EP | 02435401 A1 | * | 4/1987 |
| EP | 0 243 540 | | 11/1987 |

* cited by examiner

Primary Examiner—Thomas B. Will
Assistant Examiner—Nathan Mammen
(74) Attorney, Agent, or Firm—Husch & Eppenberger, LLC; Robert E. Muir; H. Frederick Rusche

(57) ABSTRACT

In an agricultural machine having a machine housing, a main drive axle with pivotal drive wheels, and a feed rake, an apparatus for allowing pivotal adjustment of a frontal attachment relative to the feed rake includes at least one pivot element or frame pivotally connected between the feed rake and the frontal attachment, thereby creating at least two separate pivot planes between the frontal attachment and feed rake. The pivot element pivots about a pivot axis that is generally coaxial with a crop path through the feed rake.

18 Claims, 6 Drawing Sheets

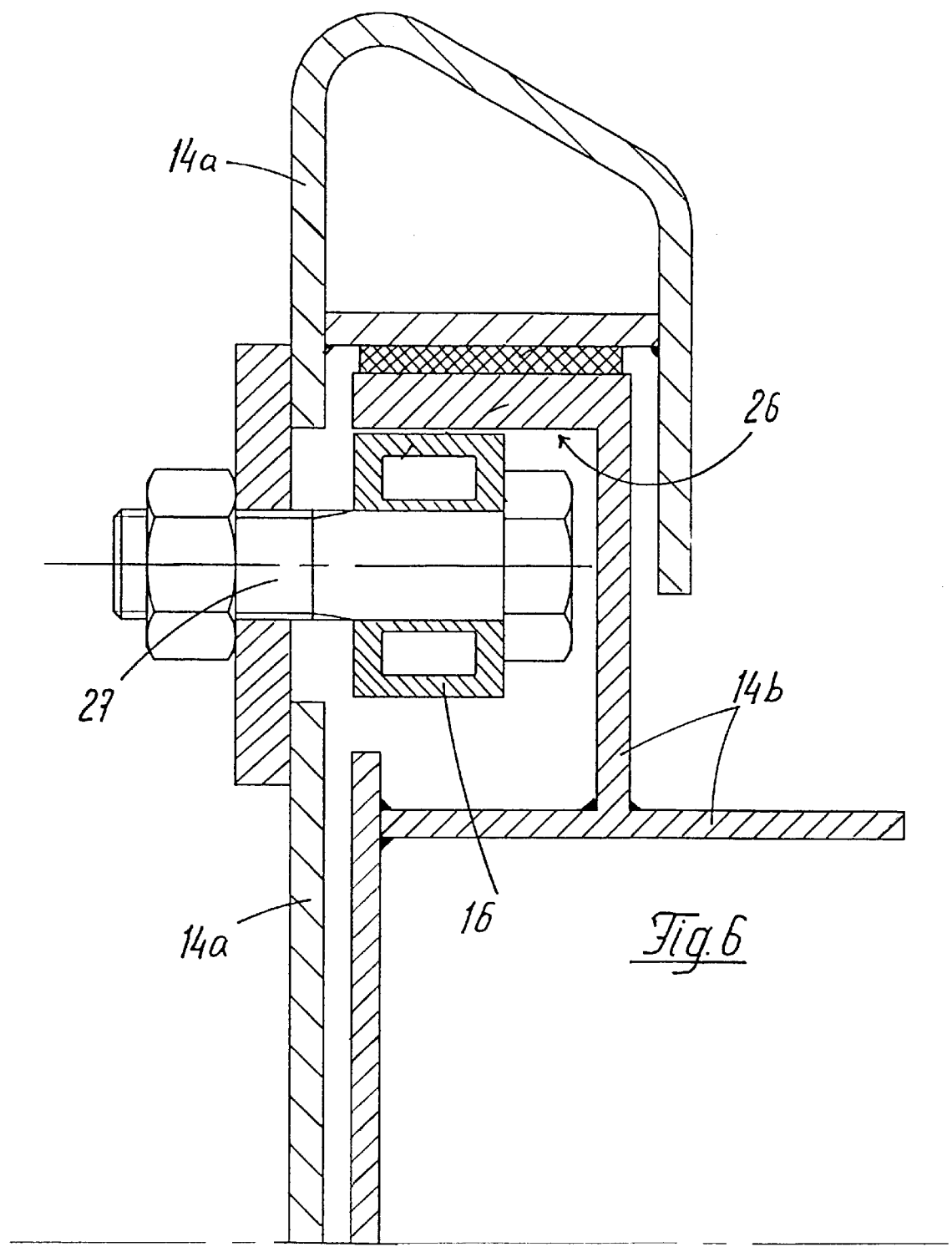

APPARATUS AND METHOD FOR PIVOTAL ADJUSTMENT OF A FRONTAL ATTACHMENT IN AN AGRICULTURAL MACHINE

FIELD OF THE INVENTION

The present invention relates generally to agricultural machinery and, more particularly, to a controllable pivoting device to allow a frontal attachment on an agricultural machine to be pivoted relative to the feed rake or machine housing of the agricultural machine.

BACKGROUND OF THE INVENTION

Agricultural harvesting machines are often equipped with a so-called leveling mechanism for ensuring that the devices in the machine housing remain generally upright so as to retain their functionality even when the agricultural machine is operating on a slope. Various leveling systems are known. One system involves a drive axle which is rigidly connected to the machine housing and which is provided with drive wheels that are pivotally mounted at its ends through the intermediary of gear trains (DBP 4 131 433). The height of each drive wheel is thus independently adjustable whereby the machine housing always adopts an upright position when working on a slope. The adjustment of the set of wheels is effected automatically when harvesting on a slope. To this end, the machine housing is equipped with at least one pendulum switch or an inclination sensor. After they have been appropriately converted, the signals from the at least one pendulum switch or the inclination sensor are used for controlling the wheel adjustment. U.S. Pat. No. 2,904,341 discloses an axle constructed in the form of a pendulum axle, which is supported such that it is hydraulically adjustable relative to the machine housing for the same purpose.

If the drive wheels are adjusted when working on a slope, it inevitably follows that the machine housing and the housing of the feed rake that is connected thereto in a torsionally stiff manner will be held upright. In contrast thereto however, the frontal attachment of the machine, which may have a cutter bar or other implement, should be guided such that it is maintained as uniformly parallel to the ground as possible so as to achieve optimal harvesting of the crop. Accordingly, it is necessary for the frontal attachment to be pivotal relative to the machine housing or the housing of the feed rake so that the frontal attachment will remain parallel or virtually parallel to the terrain. Since the terrain is constantly altering during the harvesting process, an automatic means for regulating or adjusting the frontal attachment is desired so as to lighten the load on the driver. The machine housing or the feed rake has a rectangular opening at the inlet end thereof. When working on flat land, this opening practically coincides with the feed opening in the wall portion of the frontal attachment. However, when working on a slope, the two openings are mutually displaced so that the width of the opening available for the passage of the crop may become severely restricted especially at the side boundaries thereof. Accordingly, the angle to which the frontal attachment can be adjusted is limited as a blockage of the harvested crop prior to the feed rake must be avoided at all costs. Consequently, as from a certain angle of inclination, the frontal attachment will no longer be parallel or virtually parallel to the slope, making it difficult to guide the cutter bar under the stalks when harvesting flattened grain.

The present invention is directed to overcoming one or more of the problems set forth above.

SUMMARY OF THE INVENTION

An aspect of the invention is to maximize the available pivotal adjustment of a frontal attachment of an agricultural machine relative to the housing of the machine, while minimizing any blockage of the crop feeding path from the frontal attachment to the housing.

In accordance with the above aspect of the invention, there is provided a controllable pivoting device that includes a pivot element or frame which is connected to a machine housing or feed rake of an agricultural machine such that it is pivotal about a horizontal axis. The frontal attachment is attached to the pivot frame in a rotatable or pivotal manner, which allows it to independently rotate about a horizontal axis.

The pivotal movement of the frontal attachment relative to the machine housing or the feed rake is thus effected in two approximately vertical, mutually separated pivot planes, whereby the pivot frame is disposed between the two pivot planes. The maximum possible angle of adjustment of the frontal attachment is made up of the adjustments that can be made in the two pivot planes. Due to this division of the possible pivotal movement between the two pivot planes, any blockage of the crop feeding path from the frontal attachment to the feed rake is minimized.

This aspect of the invention is merely illustrative of the innumerable aspects associated with the present invention and should not be construed as limiting in any manner.

The above and other aspects, features and advantages of the present invention will become apparent from the following detailed description when taken in conjunction with the accompanying drawings.

BRIEF DESCRIPTION OF THE DRAWINGS

Reference is now made to the drawings, which illustrate the best presently known mode of carrying out the invention and wherein similar reference characters indicate the same parts throughout the views.

FIG. 6 is a section view taken along line VI—VI in FIG. 3.

DETAILED DESCRIPTION

Figure 1:
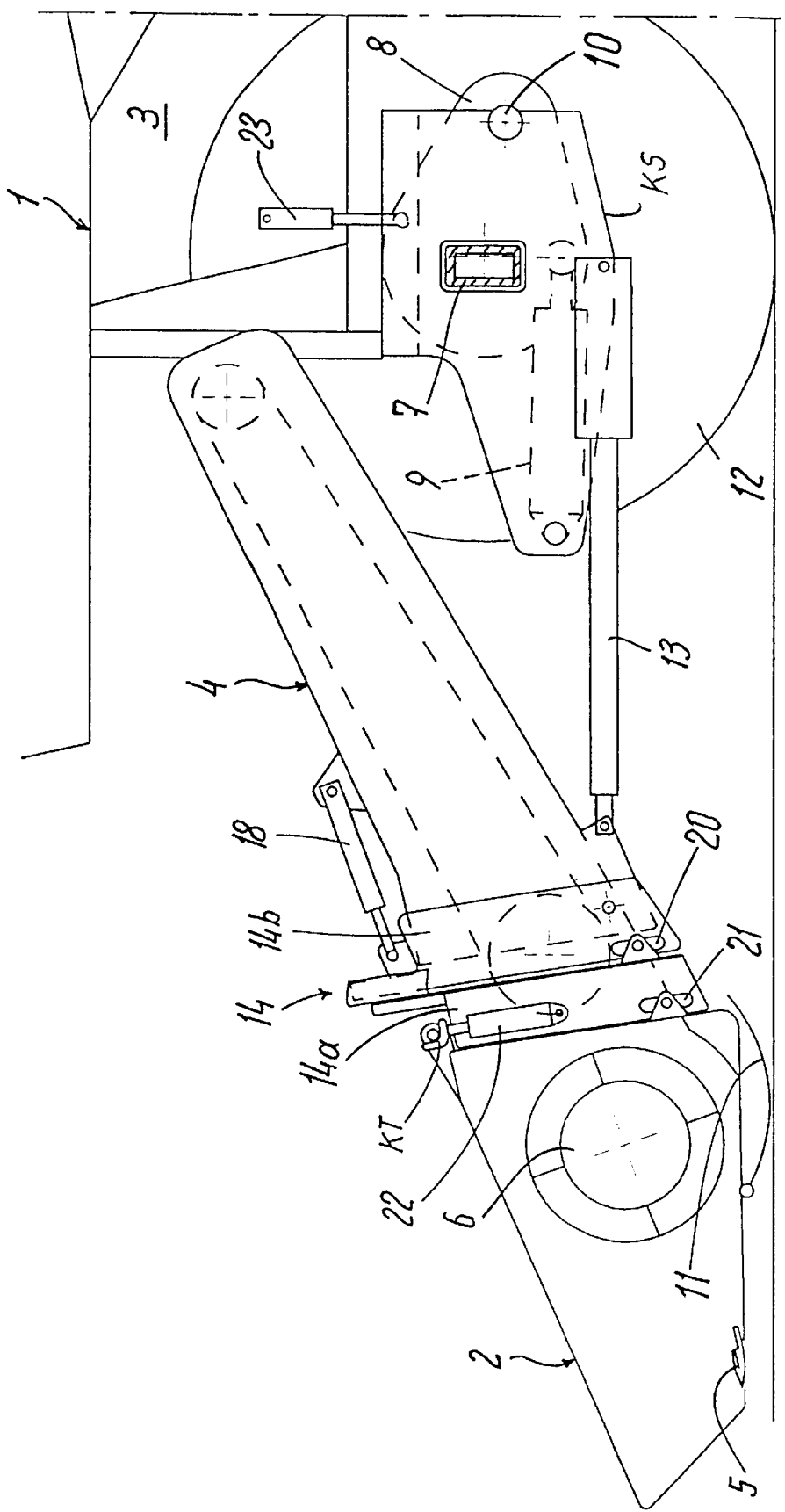
FIG. 1 is a side view of the front portion of an agricultural machine incorporating an embodiment of the present invention.
Figure 2:
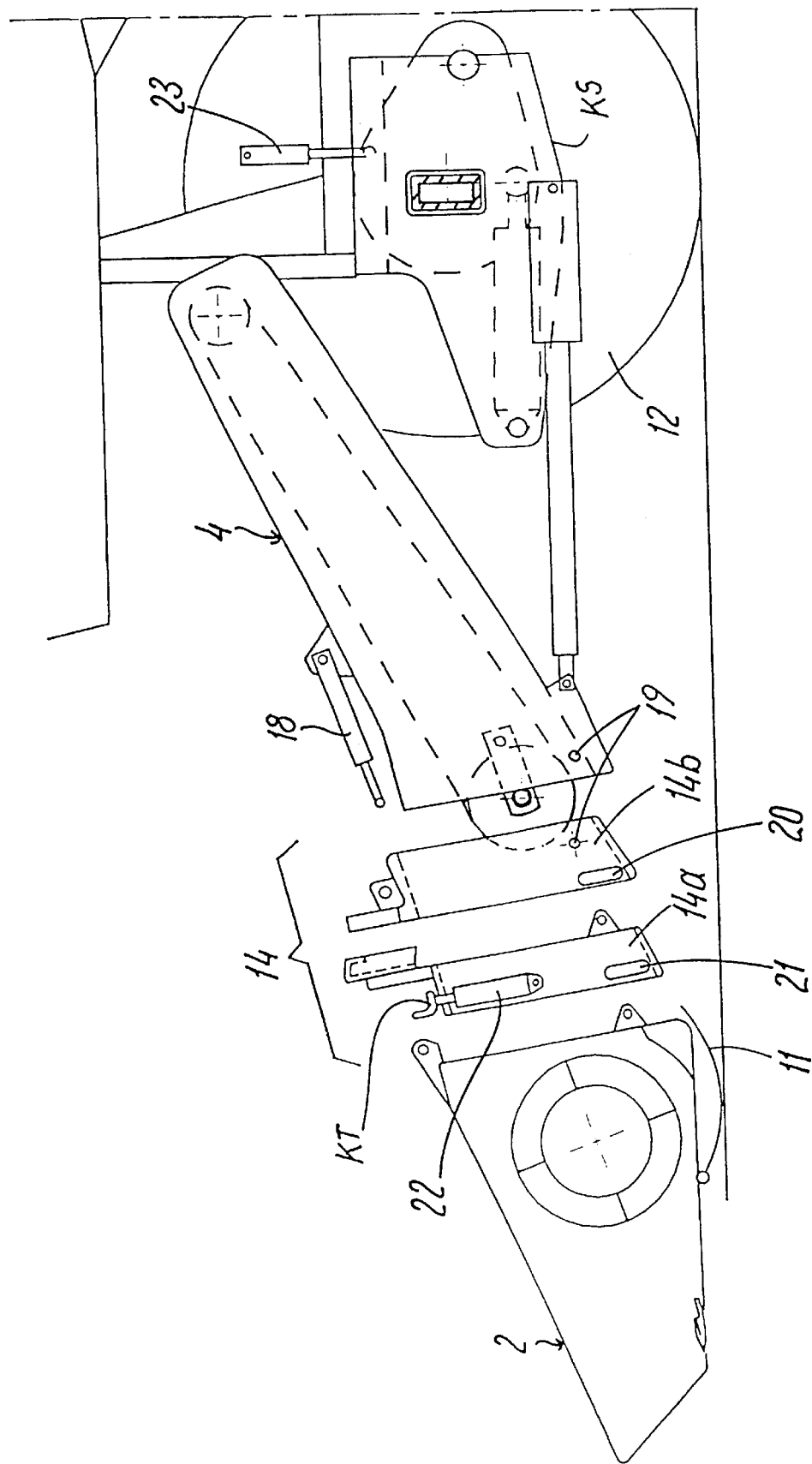
FIG. 2 is an exploded view of the components depicted in FIG. 1.
Figure 5:
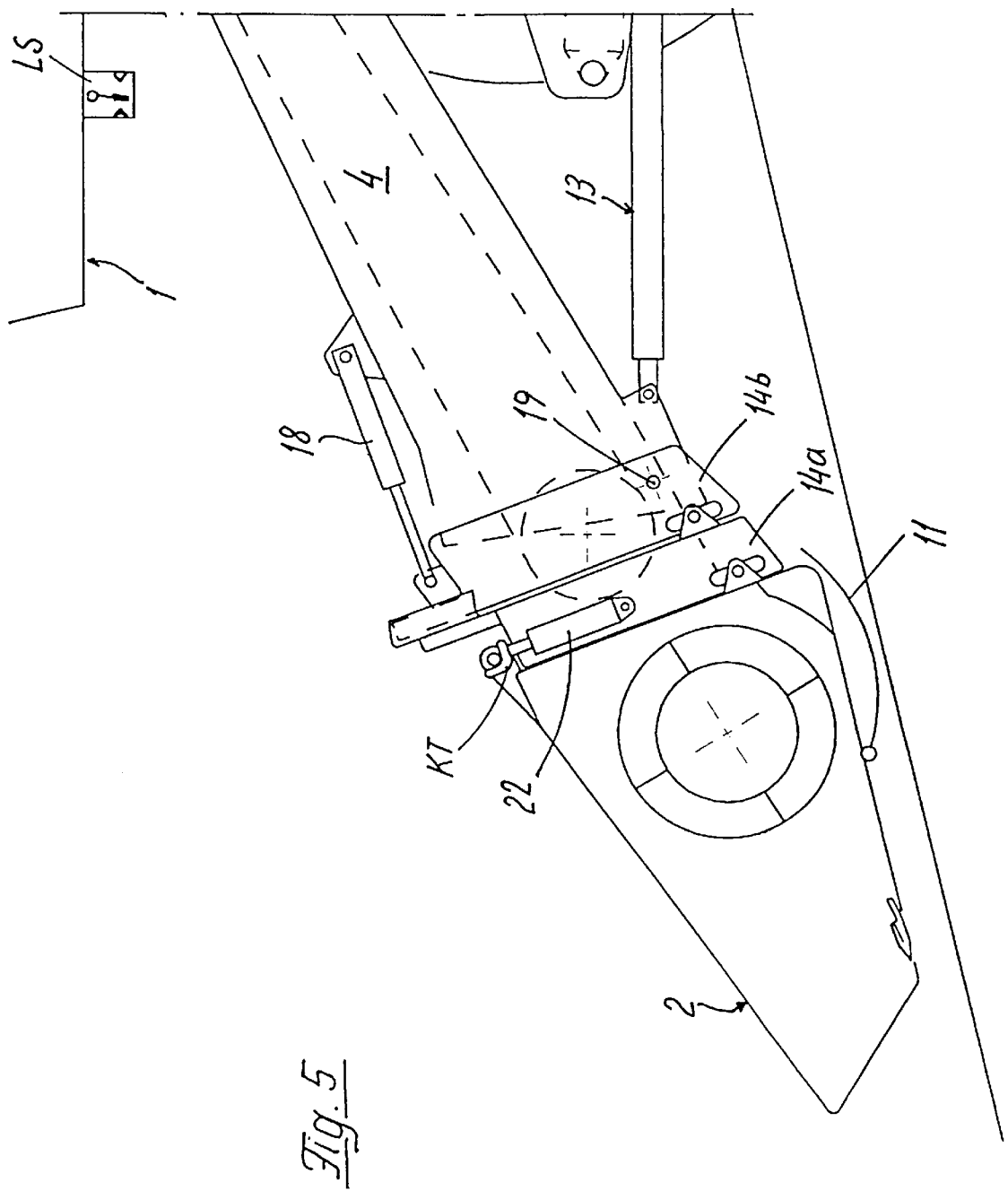
FIG. 5 is a side view of the front portion of an agricultural machine incorporating an embodiment of the present invention and having a raised cutter table.

An agricultural machine 1, illustrated in FIGS. 1, 2 and 5, is equipped with a feed rake 4, which advances the harvested crop towards a threshing mechanism (not shown), that is mounted on a machine housing 3 of the agricultural machine 1. A frontal attachment 2 in the form of a cutter assembly is connected with the feed rake 4. The frontal attachment 2 is equipped with a cutter bar 5 and a cross conveyor 6 for transporting crop cuttings to the feed rake 4. A main drive axle 7 is rigidly connected to the machine housing 3. Drive wheels 12 are mounted to the drive axle 7 through intermediate gear trains 8.

When operating on a sloped surface, the drive wheels 12 are set at differing heights according to the inclination of the slope. This ensures that the devices located in the machine housing 3, for example, a threshing mechanism or sieve device, remain horizontal, thereby preventing crop cuttings from collecting on one side of the machine housing 3. To accomplish this, the gear trains 8 are pivotally connected to the ends of the main drive axle 7 by means of consoles KS and are pivotable about fixed axles 10 in the consoles KS. Piston cylinder units 9 are supported on the consoles KS. The piston rods of the piston cylinder units 9 engage with the gear trains 8. A control device (not shown), which includes an inclination sensor QS, is mounted on the machine housing 3 of the agricultural machine 1 and provides the means to automate the adjustment of the drive wheels 12. When operating on sloping terrain, the inclination sensor QS triggers the piston cylinder units 9 to pivot the drive wheels 12 and keep the machine housing 3 in a generally upright position.

As shown in FIGS. 2 and 5, the frontal attachment 2 is coupled to the feed rake 4 (or the machine housing 3 in an alternate embodiment) by means of a controllable pivoting device 14. In the embodiment shown, the pivoting device 14 includes a pivot element or frame 14a to which the frontal attachment 2 is mounted. The frontal attachment is pivotal relative to the pivot frame 14a. The pivot frame 14a and the frontal attachment 2 are rotatable either separately or together about a rotational axis 15, which extends in a direction transverse to the main drive axle 7. In order to ensure that the one end of the frontal attachment is lowered with respect to the central longitudinal axis of the harvesting machine by the same amount as the other end is raised, the rotational axis 15 is located within and as close as possible to the center of the inlet opening of the feed rake 4.

In one embodiment, a tilt frame 14b, to which the pivot frame 14a is mounted, is also incorporated into the pivoting device 14. The pivot frame 14a is pivotal relative to the tilt frame 14b. As shown in FIG. 6, the pivot frame 14a and the tilt frame 14b are connected by means of guide rollers 16, 17 that are mounted in rocker arms. The tilt frame 14b is pivotal about a lower transverse axis 19 by means of piston cylinder units 18 to adapt the frontal attachment 2 to the rises or falls in the terrain in the agricultural machine's 1 direction of travel. The pivot frame 14a is pivotal relative to the tilt frame 14b about the axis 15. The tilt frame 14b is provided with slots 20, which are engaged by studs connected to the pivot frame 14a. The pivot frame 14a and tilt frame 14b are thereby connected together while retaining their pivotability.

Figure 3:
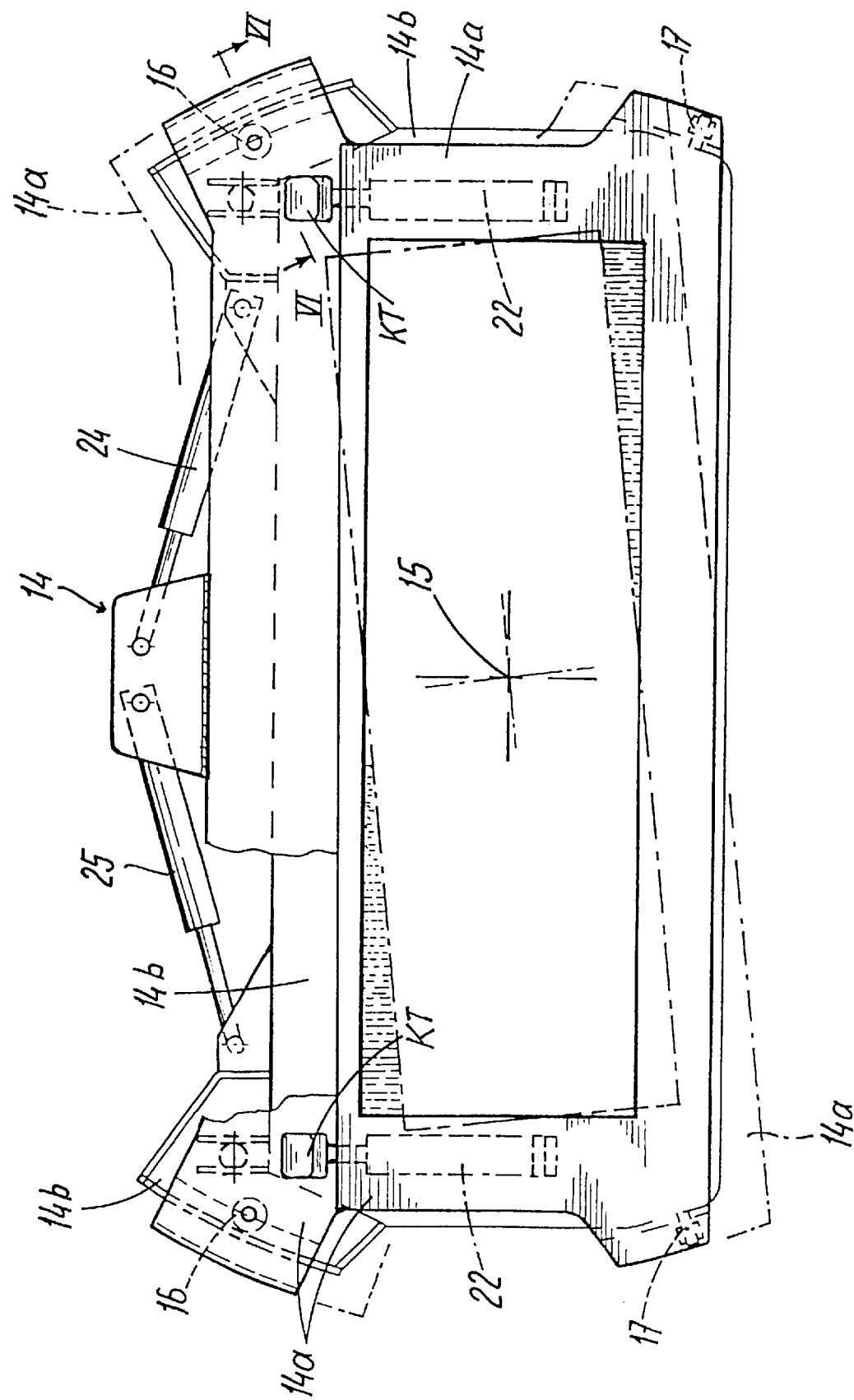
FIG. 3 is a front view of an embodiment of the present invention in its basic position as viewed towards the inlet opening of the feed rake.

FIG. 3 illustrates the manner in which the pivot frame 14a is pivoted about the rotational axis 15 by means of piston cylinder units 24, 25 that are supported on the tilt frame 14b. The lower part of the pivot frame 14a is provided with slots 21, which are engaged by studs on the frontal attachment 2. The frontal attachment 2 is pivoted relative to the pivot frame 14a by means of further piston cylinder units 22, which are mounted, on the sides of the pivot frame 14a. The piston rods thereof are equipped with coupling members KT whose upright arms engage behind fixed studs on the frontal attachment 2.

FIG. 3 illustrates how the frontal attachment 2 is pivoted. A generally level position, wherein the drive wheels 12 are at the same height and parallel to the bottom of the machine housing 3, is shown by solid lines. In this position the feed openings of the pivot frame 14a and the tilt frame 14b are fully aligned with the opening in the feed rake 4. If the agricultural machine 1 encounters a slope, the drive wheels 12 are adjusted in the manner described above. Sensors 23 register this adjustment of the drive wheels 12 and simultaneously trigger the piston cylinder units 24, 25 to actuate the pivoting device 14. The sensors 23 are preferably in the form of hydraulic master cylinders. The pivot frame 14a and frontal attachment 2 are thereby adjusted based on the inclination of the terrain over which the agricultural machine 1 is traveling.

FIG. 3 also shows a pivoted position indicated by dash-dotted lines wherein the pivot frame 14a and frontal attachment 2 have been pivoted counter-clockwise about the rotational axis 15. In particular, the figure illustrates the stepped nature of the pivoting device 14. A clockwise pivot would be accomplished in a similar manner. The pivot frame 14a and tilt frame 14b are connected by guide rollers 16, which are supported on guide surfaces 26, preferably in the form of rocker arms, of the tilt frame 14b and rotatably mounted on the pivot frame 14a. As shown in FIG. 6, the guide and retaining rollers 16 are rotatably mounted on the pivot frame 14a by bolts 27. That portion of the pivot frame 14a in the vicinity of the guide rollers 16 is U-shaped so that it encompasses webs on the tilt frame 14b. This arrangement renders the pivot frame 14a and tilt frame 14b non-displaceable in the longitudinal direction while leaving the frames 14a, 14b pivotal.

Figure 4:
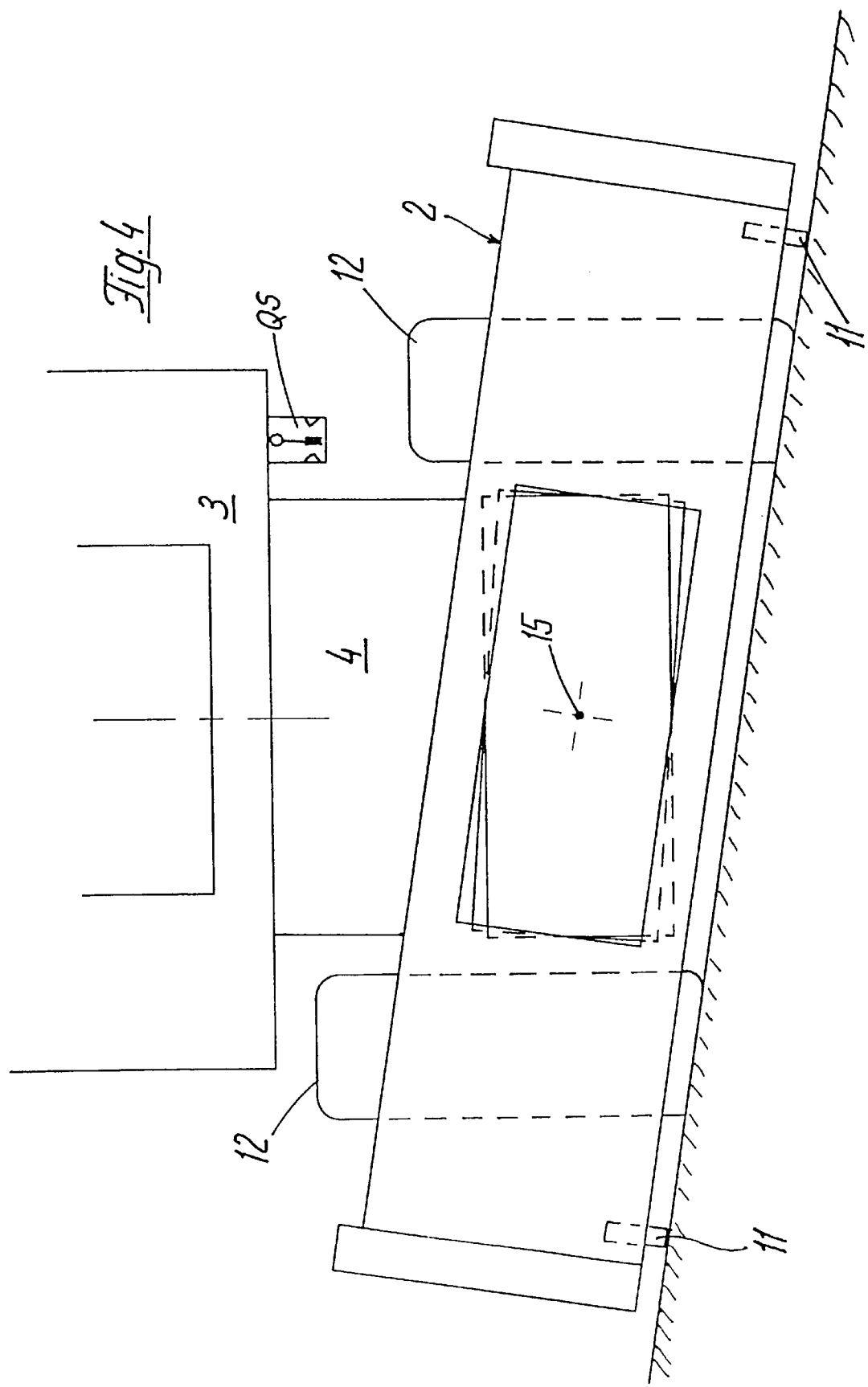
FIG. 4 is a front view of the harvesting machine of FIG. 1.

Should the inclination of the terrain become still greater, the piston cylinder units 22 will pivot the frontal attachment 2 relative to the pivot frame 14a. This pivotal movement is limited by the slots 21 in the pivot frame 14a. FIG. 4 depicts the maximum inclined position of the frontal attachment 2 relative to the machine housing 3, which coincides with the maximum height displacement of the drive wheels 12. FIG. 4 also illustrates that the passage through which crop cuttings flow from the frontal attachment 2 and through the pivot frame 14a and tilt frame 14b is composed of three off-set steps in the longitudinal direction of the machine so as to prevent blockage of the harvested crop.

As shown in FIG. 5, the frontal attachment 2, including the feed rake 4, is raised or lowered by means of piston cylinder units 13. Probes 11 are used to sense the distance from the surface of the field to the frontal attachment 2 and initiated an appropriate adjustment of the piston cylinder units 22, 24, 25. The frontal attachment 2 is thereby kept parallel to the field surface even when there are only very small changes in the position of the frontal attachment 2 to the field surface.

While a preferred embodiment of the present invention has been illustrated and described, this has been by way of illustration and the invention should not be limited except as required by the scope of the appended claims.

We claim:

1. An agricultural machine that adjusts for uneven ground comprising:

a machine housing;

a main drive axle with pivotable drive wheels mounted thereto;

adjusting devices that align the machine housing on uneven ground;

a feed rake attached to the machine housing;

a frontal attachment; and a pivoting device for coupling the frontal attachment to the feed rake that includes at least one pivot element rotatably connected with both the feed rake and the frontal attachment to create at least two separate and substantially parallel pivot planes between the feed rake and the frontal attachment, the substantially parallel pivot planes having a common pivot axis that is transverse to the main drive axle, wherein the pivot element and the frontal attachment are rotatable about the pivot axis.

2. The agricultural machine as set forth in claim 1, further including an enclosed path, having a center, for harvested crops passing through the feed rake, wherein the pivot axis is approximately coaxial with the center of the enclosed path.

3. The agricultural machine as set forth in claim 1, wherein a maximum possible pivotal angle of the frontal attachment relative to the feed rake is formed by the sum of at least two angles of adjustment available in the two separate pivot planes.

4. The agricultural machine as set forth in claim 1, wherein the at least one pivot element is adjustable relative to any other pivot elements and to the feed rake and the frontal attachment through adjusting elements.

5. The The agricultural machine as set forth in claim 4, wherein the adjusting elements are piston cylinder units.

6. The agricultural machine as set forth in claim 1, wherein contour sensors are disposed at each end of the frontal attachment for detecting ground contours.

7. The agricultural machine as set forth in claim 6, wherein the contour sensors are in the form of electro-mechanical probes.

8. The agricultural machine as set forth in claim 1, wherein the frontal attachment is adjustable relative to the pivot element through adjusting elements.

9. The agricultural machine as set forth in claim 8, wherein the adjusting elements are piston cylinder units.

10. The agricultural machine as set forth in claim 1, wherein the at least one pivot element is provided with guide rollers that are rotatably mounted on the at least one pivot element and supported on guide surfaces of an adjacent pivot element.

11. The agricultural machine as set forth in claim 10, wherein the guide rollers are guided by rocker arms located in webs of the adjacent pivot element.

12. The agricultural machine as set forth in claim 1, further including a tilt frame connected between the pivot element and the feed rake, wherein the tilt frame, the pivot element and the frontal attachment are tiltable about a tilt axis that is transverse to a rotational axis of the at least one pivot element.

13. The agricultural machine as set forth in claim 12, wherein the tilt frame is located between the at least one pivot element and the feed rake.

14. The agricultural machine as set forth in claim 12, wherein the tilt axis of the tilt frame is located in a lower region of the machine housing associated with the feed rake.

15. The agricultural machine as set forth in claim 12, wherein the tilt frame, the pivot element and frontal attachment are tilted about the tilt axis by a piston cylinder unit.

16. An agricultural machine that adjusts for uneven ground comprising:
- a machine housing;
- a main drive axle with pivotable drive wheels mounted thereto;
- adjusting devices that align the machine housing on uneven ground;
- a feed rake attached to the machine housing;
- a frontal attachment;
- a pivoting device for coupling the frontal attachment to the feed rake that includes at least one pivot element rotatably connected with both the feed rake and the frontal attachment to create at least two separate pivot planes between the feed rake and the frontal attachment, wherein the pivot element and the frontal attachment are rotatable about a pivot axis that is transverse to the main drive axle, wherein the at least one pivot element is adjustable relative to any other pivot elements and to the feed rake and the frontal attachment through adjusting elements; and
- wherein the adjusting elements are controlled by a hydraulic master cylinder at least partially responding to at least one tilt sensor that detects a position of the pivotal drive wheels relative to the machine housing.

17. An agricultural machine that adjusts for uneven ground comprising:
- a machine housing;
- a main drive axle with pivotable drive wheels mounted thereto;
- adjusting devices that align the machine housing on uneven ground;
- a feed rake attached to the machine housing;
- a frontal attachment;
- a pivoting device for coupling the frontal attachment to the feed rake that includes at least one pivot element rotatably connected with both the feed rake and the frontal attachment to create at least two separate pivot planes between the feed rake and the frontal attachment, wherein the pivot element and the frontal attachment are rotatable about a pivot axis that is transverse to the main drive axle, wherein the frontal attachment is adjustable relative to the pivot element through adjusting elements; and
- wherein an angle of the pivot element relative to the feed rake is dependent on a current position of the drive wheels, and wherein pivotal adjustment of the frontal attachment relative to the pivot element is dependent on the distance of the frontal attachment from the ground.

18. An agricultural machine that adjusts for uneven ground comprising:
- a machine housing;
- a main drive axle with pivotable drive wheels mounted thereto;
- adjusting devices that align the machine housing on uneven ground;
- a feed rake attached to the machine housing;
- a frontal attachment;
- a pivoting device for coupling the frontal attachment to the feed rake that includes at least one pivot element rotatably connected with both the feed rake and the frontal attachment to create at least two separate pivot planes between the feed rake and the frontal attachment, wherein the pivot element and the frontal attachment are rotatable about a pivot axis that is transverse to the main drive axle, wherein the frontal attachment is adjustable relative to the pivot element through adjusting elements; and
- wherein position of the drive wheels in relation to the ground is dependent on an inclination sensor, wherein the pivotal adjustment of the pivot element utilizes at least one sensor that detects height of the drive wheels, and wherein pivotal adjustment of the frontal attachment is dependent on a plurality of ground probes connected with the frontal attachment.

* * * * *